INVENTOR
*Emerito Sainz Lopez*

April 8, 1969  E. S. LOPEZ  3,437,031
SYSTEM FOR PROCESSING ASPARAGUS FOR CANNING
Filed Dec. 19, 1966  Sheet 8 of 8

INVENTOR
Emerito Sainz Lopez

BY  Karl W. Flocks
ATTORNEY

United States Patent Office 3,437,031
Patented Apr. 8, 1969

3,437,031
SYSTEM FOR PROCESSING ASPARAGUS
FOR CANNING
Emerito S. Lopez, %  Fabrica de Conservas,
Mendavia, Navarra, Spain
Filed Dec. 19, 1966, Ser. No. 602,878
Claims priority, application Spain, Dec. 23, 1965, 321,117;
Oct. 21, 1966, 332,572
Int. Cl. A23b 7/00
U.S. Cl. 99—404                                    16 Claims

ABSTRACT OF THE DISCLOSURE

A system for preparing raw harvested asparagus for canning including conveyor means, washing apparatus, asparagus trimming apparatus, scalding apparatus, grading apparatus, and peeling apparatus.

The prior art gives rise to many problems in the preparing of raw harvested asparagus which are overcome by the present invention. Some of the problems inherent in the prior art are as follows:

The asparagus is generally washed manually, the washing has generally been incomplete and a considerable amount of time and labor was necessary to align the asparagus for subsequent operations, and a high percentage of breakage generally resulted.

The asparagus, when conveyed on a continuous belt, in relation to a fixed guide and cutting blade, was not properly retained during trimming or cutting, so the operation was constantly interrupted due to improper retention of the asparagus.

The asparagus, when scalded preparatory to sizing and peeling, was generally disposed in a vertical position relative to conical buckets with the asparagus tips upwards, and the scalding was generally incomplete or imperfect.

Sizing or classification of the asparagus was generally carried out by gravity and diversion belts, and the asparagus was generally deformed or damaged, or improperly classified, and improper classification resulted in a reduction of the price due to improper classification.

Peeling was generally accomplished semimanually, wherein the operator placed the asparagus in a machine, and prior art peeling machines have given rise to frequent jamming in that the evacuation or removal of the material being peeled from the fruit was not accomplished properly, thus resulting in jamming of the equipment and loss of time and labor.

Primary objects of the present invention are:

To provide a novel system and novel components for processing apparatus which overcome the shortcomings of the prior art as mentioned above;

To provide a novel conveyor means including a portion for eliminating some of the foreign matter mixed with the raw asparagus being processed;

To provide a novel washing apparatus which maintains the raw asparagus in an oriented position for subsequent processing, as well as protecting the asparagus from damage while the asparagus is being washed;

To provide a novel asparagus trimming apparatus which minimizes apparatus breakage and apparatus shut-downs;

To provide a novel scalding apparatus;

To provide a novel grading or sizing apparatus;

To provide a novel peeling apparatus; and

To provide a system utilizing these above-mentioned novel components in which the preparation of raw asparagus is substantially automatic and results in more efficient grading of the asparagus, less damage to the asparagus being processed, minimizes expenditure of time and manual labor, as well as enabling canning of asparagus to return a greater profit.

Other and more specific objects and advantages of the invention will become apparent from a consideration of the following description and the drawings forming a part thereof, wherein:

FIG. 5d is a fragmentary, enlarged plan view showing a portion of the apparatus illustrated in FIG. 5a.

*Preliminary sorting conveyor*

Figure 1:
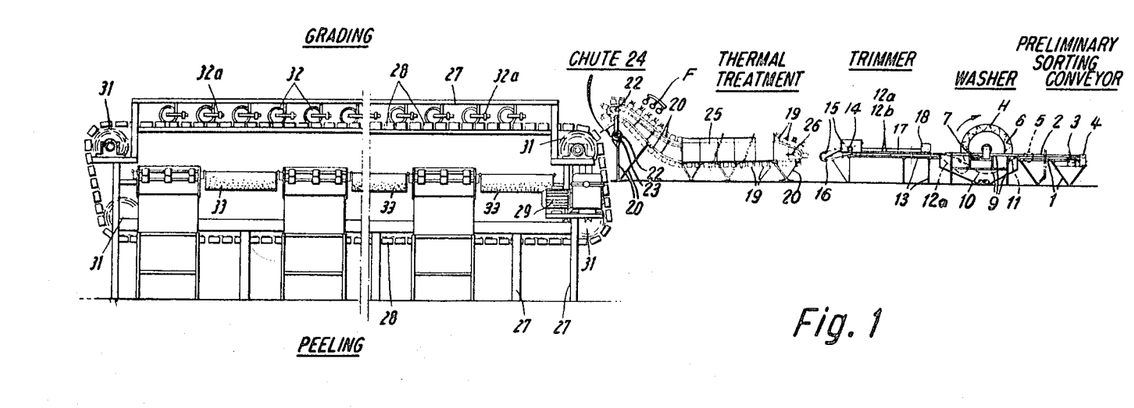
FIG. 1 is a reduced schematic showing in side elevation of the apparatus in accordance with the invention. Reading FIG. 1 from right to left, one observes in sequence the conveyor means, the washing apparatus, the trimming apparatus and then the scalding equipment which is in the center of this figure and is followed at the left by the grading apparatus in the upper portion which is above the peeling equipment.
Figure 1A:
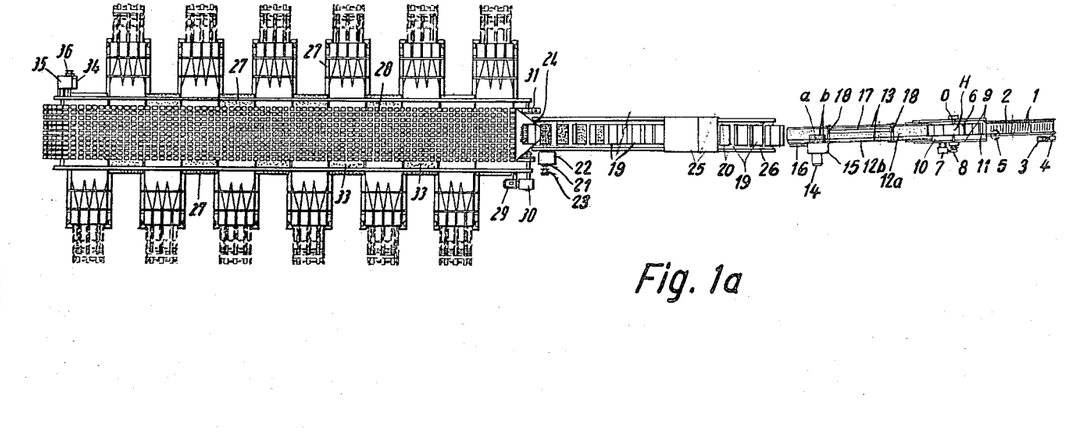
FIG. 1a is a schematic plan view of the apparatus shown in FIG. 1.
Figure 2:
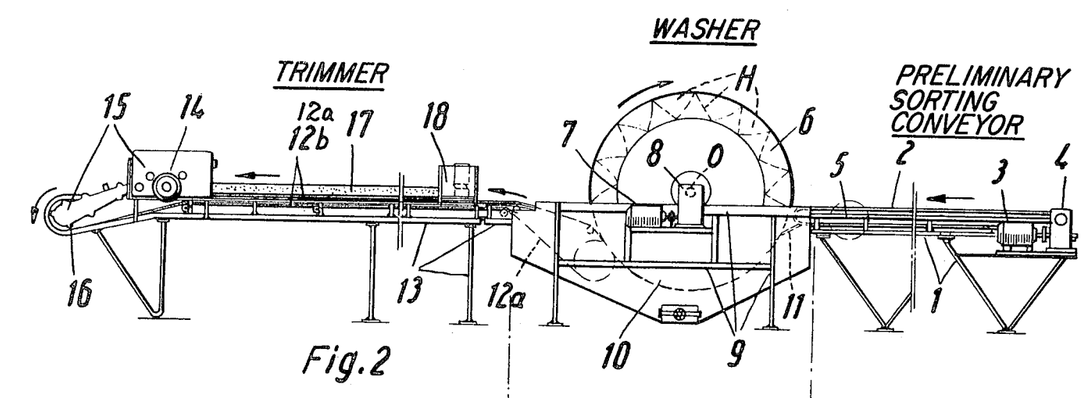
FIG. 2 is a view in side elevation and has to be read from right to left. It shows the conveyor, the washer, and the trimmer.
Figure 3:
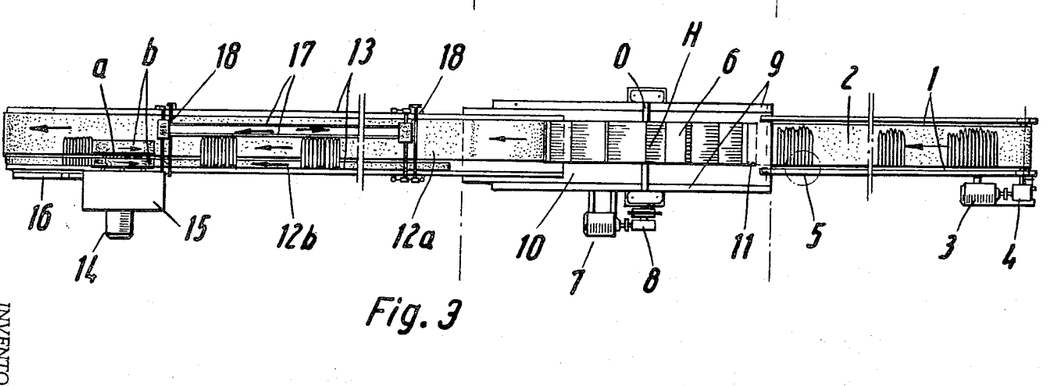
FIG. 3 is a plan view of the apparatus shown in FIG. 2.

Referring to the drawings in detail and more particularly to FIGS. 2 and 3, preliminary sorting of the asparagus takes place on the conveyor at the right which includes a frame 1 and a horizontal conveyor belt 2 driven by an electric motor 3 through a reduction gear 4. At the left or exit end of the conveyor belt 2, a lateral opening 5 is provided. Previously untreated asparagus coming directly from the harvest are carried by the conveyor belt 2 and sorted out. Those untreated asparagus which are not of the proper quality standard are rejected and passed out of the apparatus through the lateral opening 5.

*Washer unit*

Generally in the center of the apparatus illustrated in FIGS. 2 and 3 there is shown the washer or washing unit which comprises a washing drum 6 rotating about a horizontal axis O. This washing drum 6 is fashioned in the manner of a bucket device with special containers or compartments H. The washing unit is rotatably driven by an electric motor 7 through a reduction gear 8. A water tank 10 is disposed beneath the washing drum 6, which washing drum 6 is mounted on a supporting frame 9. The drum 6 is partially submerged in the water tank 10. A flexible rubber wall 11 is provided for the inlet of the asparagus to the washing unit. This flexible rubber wall 11 associates the exit end of the conveyor 2 with a lower portion of the drum 6.

The stems of asparagus are arranged on the preliminary sorting conveyor 2 with their axes in transverse relation to the longitudinal run of the conveyor 2 and with their tips all pointing in the same direction. One viewing the asparagus stems in plan on the conveyor 2 as illustrated in FIG. 3 would observe that all the tips were pointing north as the asparagus travelled from east to west. This will be understood that the asparagus enter the individual buckets or containers or compartments H by passing over the flexible rubber wall 11 and without changing their orientation given to them on the preliminary sorting conveyor 2.

The asparagus are maintained in this position during washing. In the washing step any adhering earth or other impurities are removed from the asparagus and the asparagus stems exit from the washing unit and are made ready to face the trimming device.

Trimming apparatus

The trimming apparatus is illustrated at the left in FIGS. 2 and 3 and serves to cut the individual asparagus stems so that all of them are the same length.

This trimming apparatus comprises a first, comparatively long and wider conveyor belt 12a, beginning of which is in the immediate vicinity of the exit side of the lower portion of the drum 6, so that the washed asparagus stems which leave the drum 6 may be received on the belt 12a. A shorter and narrower second conveyor belt 12b is disposed parallel to the longer and wider belt 12a. Both conveyor belts 12a and 12b are mounted on a common supporting frame 13. An electric motor 14 drives the conveyor belts 12a and 12b through a reduction gear 15 and transmission chain 16.

Cooperating with the belts 12a and 12b for moving the asparagus stems is the belt 17 which travels in a vertical plane in a horizontal direction parallel to the movement of the belts 12a and 12b. The tips of the asparagus stems, which are oriented to the north, contact the vertical belt 17 so that generally all the tips are in the same vertical plane. Belts 12a, 12b and 17 move at the same lineal speed. In order to be able to adjust the cut length of the asparagus stems, the vertical belt 17 is provided with an adjustment device 18 so that the entire vertical belt 17 may be moved somewhat to the north and somewhat to the south.

As the lineal speed of the belts 12a, 12b and 17 is the same, the asparagus stems maintain their alignment and north-south orientation as they arrive at the position of the cutting blade a which serves to cut the long lower asparagus sections from the asparagus stems.

Holding the asparagus stems in position during the cutting operation are the two belts b, b, one on each side of the blade a. Belts b, b are made of or covered with porous rubber such as sponge or foam and they serve to protect the asparagus during the cutting operation. The operation of the cutting blade a effects a severing of the lower asparagus sections so that the asparagus stems are trimmed to identical lengths and continue on in the process while resting on belt 12a whereas the lower removed asparagus sections travel to another place on belt 12b.

Scalding apparatus or heat treatment station

Figure 4:
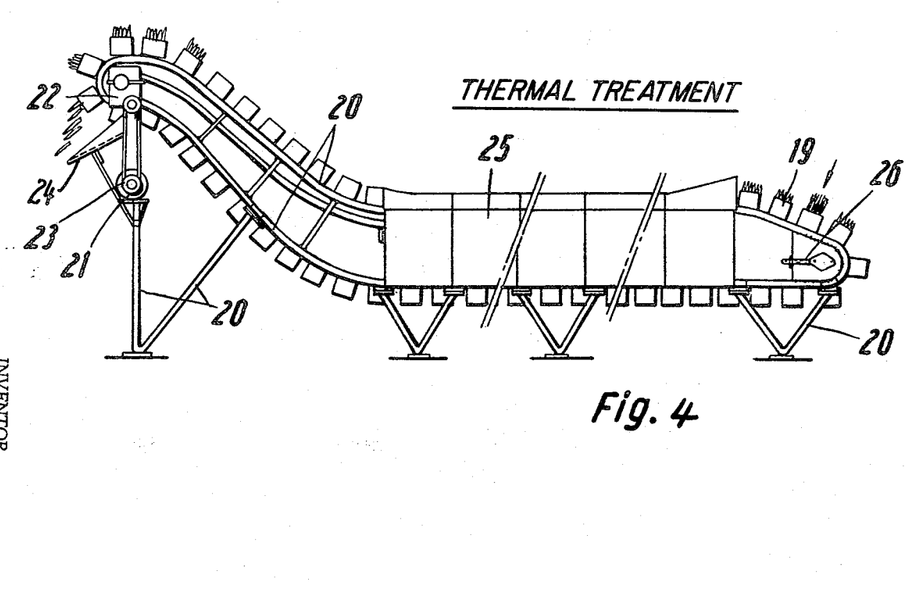
FIG. 4 is a view in side elevation of the scalding apparatus.
Figure 4A:
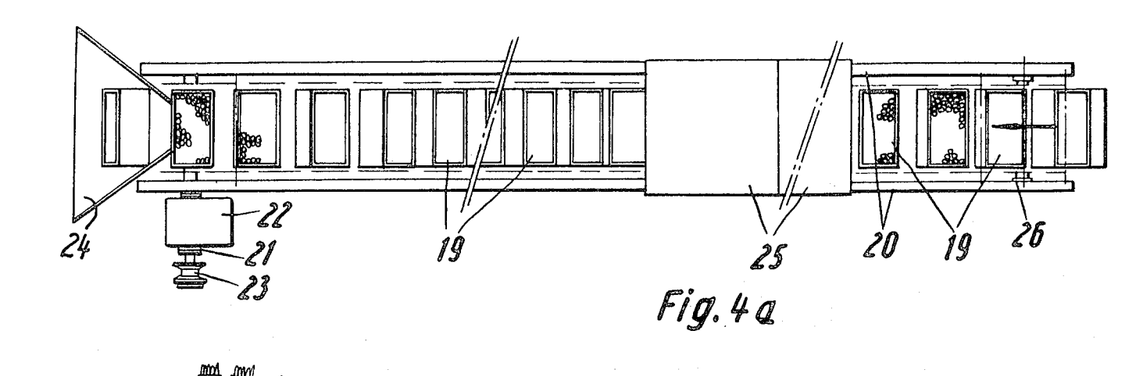
FIG. 4a is a top plan view of the apparatus shown in FIG. 4.

The scalding of the asparagus stems takes place at the treatment station which includes a heating unit and as illustrated in FIGS. 4 and 4a. A large number of receiving containers or buckets 19 which are adapted to hold the asparagus stems with the cut ends in the bottoms of the containers and the tips projecting out through the mouth thereof. These buckets or containers 19 have their bottoms fastened to a continuous chain or chains supported by the looped frame 20 and this chain or chains is or are driven by an electric motor 21 associated with a reduction gear 22 and a variable speed gear 23 so that an adjustment of the lineal speed of the buckets or containers 19 may be effected as required. A regulating device 26 is provided so that the tension of the chain or chains with which the buckets or containers 19 is or are associated can be adjusted as required. The boiler or heat treatment chamber 25 is associated with the moving buckets or containers 19 in such fashion so that the asparagus stems upon passing through the heating chamber 25 have been heated or cooked therein as required and may exit from the heating chamber 25 and through the discharge chute 24. The containers or buckets 19 may be a cubical configuration or rectangular section and they will hold the asparagus stems well so that they cannot fall or tilt excessively during the scalding process. These containers or buckets 19, moreover, permit a convenient loading. For example, the asparagus stems can be inserted in the containers or buckets 19 at a location away from the area of influence of the heating chamber 25 wherein steam is emitted. Thus, it will be understood, that the operator need not unduly suffer from the heat in any way.

So that efficient emptying of the containers or buckets 19 may be effective, the frame 20, which supports the chain or chains to which the containers or buckets 19 are fastened, is shaped like a swan's neck.

In order to make sure that the tips of the asparagus, which are the most delicate part of the vegetable, are not affected deleteriously, provision is made within the scalding apparatus to feed greater or lesser amounts of steam or other treating medium such as water. After the heat treatment, the shower system F effects a rapid and efficient cooling of the tips of the asparagus so as to condition the vegetables for their further treatment in the process.

After passing through the shower F, the asparagus stems arrive at the chute 24 from which they may pass on to the grading apparatus.

Grading apparatus

The apparatus for sorting the various stems of the asparagus according to the diameter of each stem is illustrated in FIGS. 5, 5a, 5b, 5c and 5d.

Figure 5:
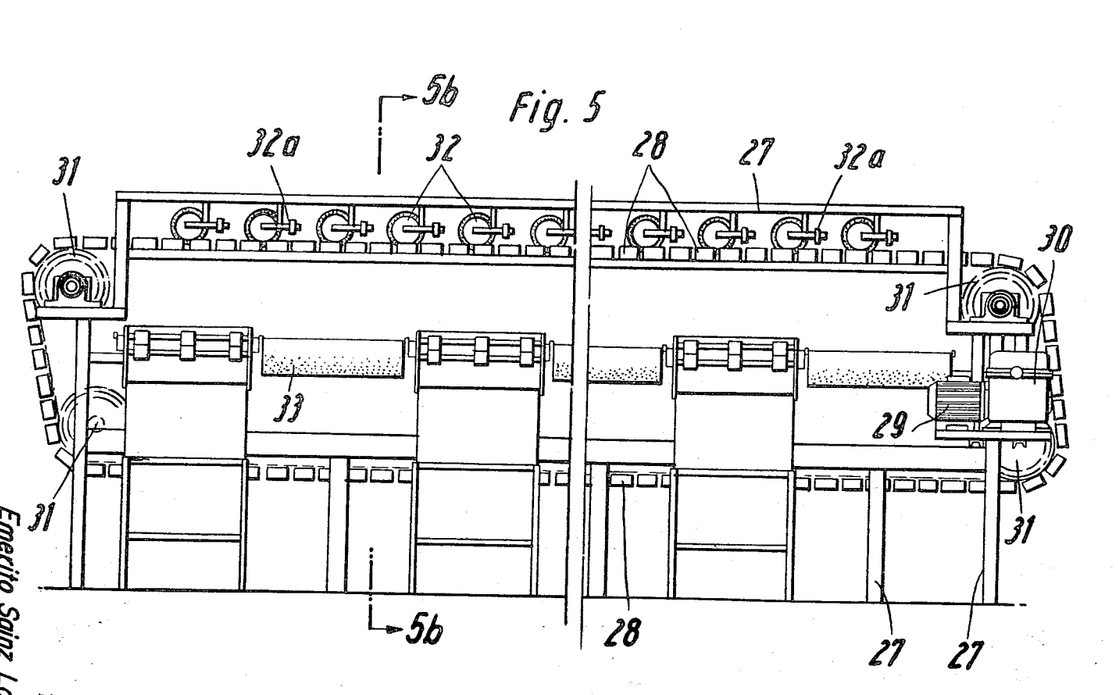
FIG. 5 is a view in side elevation including the grading apparatus above and the peeling apparatus below and with an intermediate portion of the apparatus omitted.

In FIG. 5, a base frame 27 is illustrated as carrying a plurality of articulated conveyor belt portions 28 which are triangular in a cross section taken at right angles to their path of travel. An electric motor 29, with a reduction gear 30, serves to drive the conveyor belts 28 with the aid of drive rollers 31 which serve to sustain the conveyor belts 28 which bear thereon.

Figure 5A:
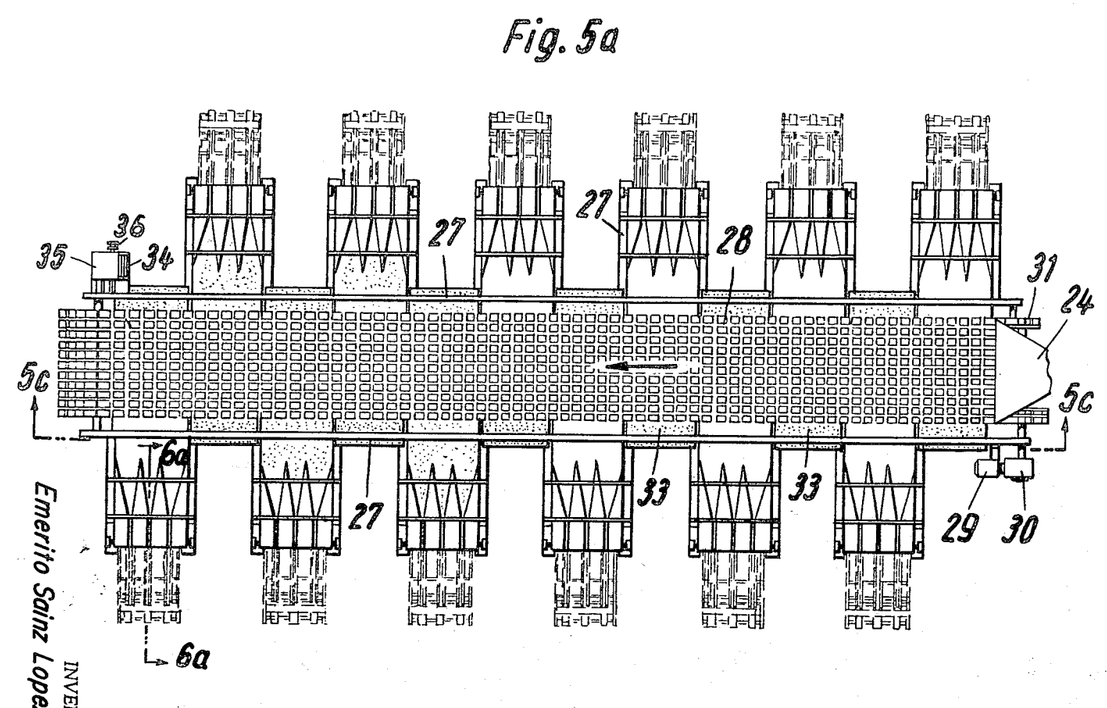
FIG. 5a is a top plan view of the apparatus illustrated in FIG. 5 but on a reduced scale. The upper structure of the apparatus has been removed.

At the right or the inlet side of the apparatus illustrated in FIG. 5a, there appears the heating unit discharge chute 24 which is also illustrated in FIGS. 4 and 4a.

Pivotally suspended pressure or weighted wheels 32, which have counterweights 32a, engage the asparagus stems which lie in the recesses which exist between the articulated portions of the conveyor belts 28 which are of triangular section. The sectional triangular configuration will be seen in FIG. 5b which also shows the pressure wheels 32 and the conveyor belt portions 28.

Figure 5B:
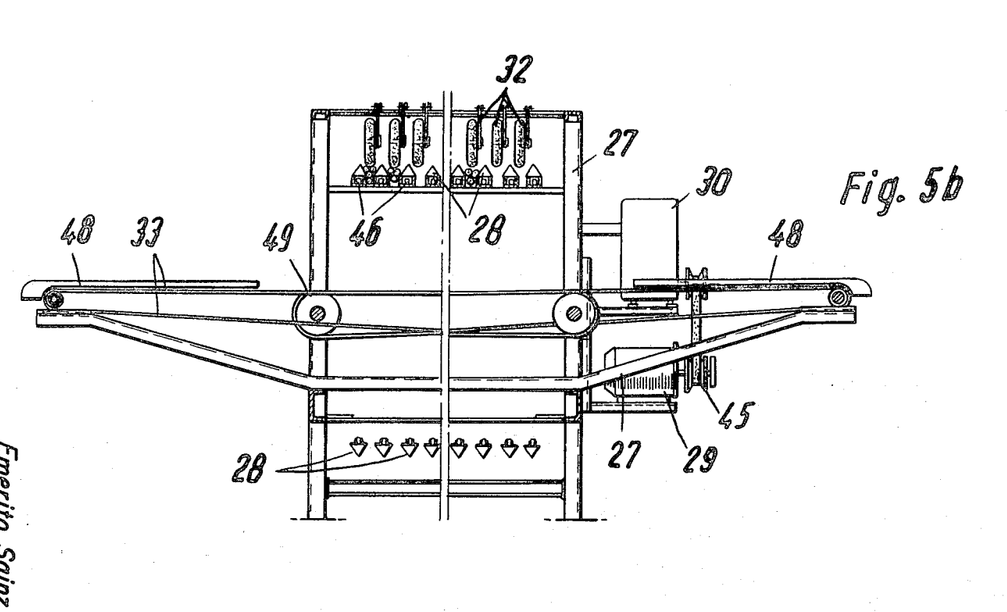
FIG. 5b is a vertical section taken in the plane of the line 5b—5b of FIG. 5 and looking in the direction of the arrows with some parts removed.
Figure 5C:
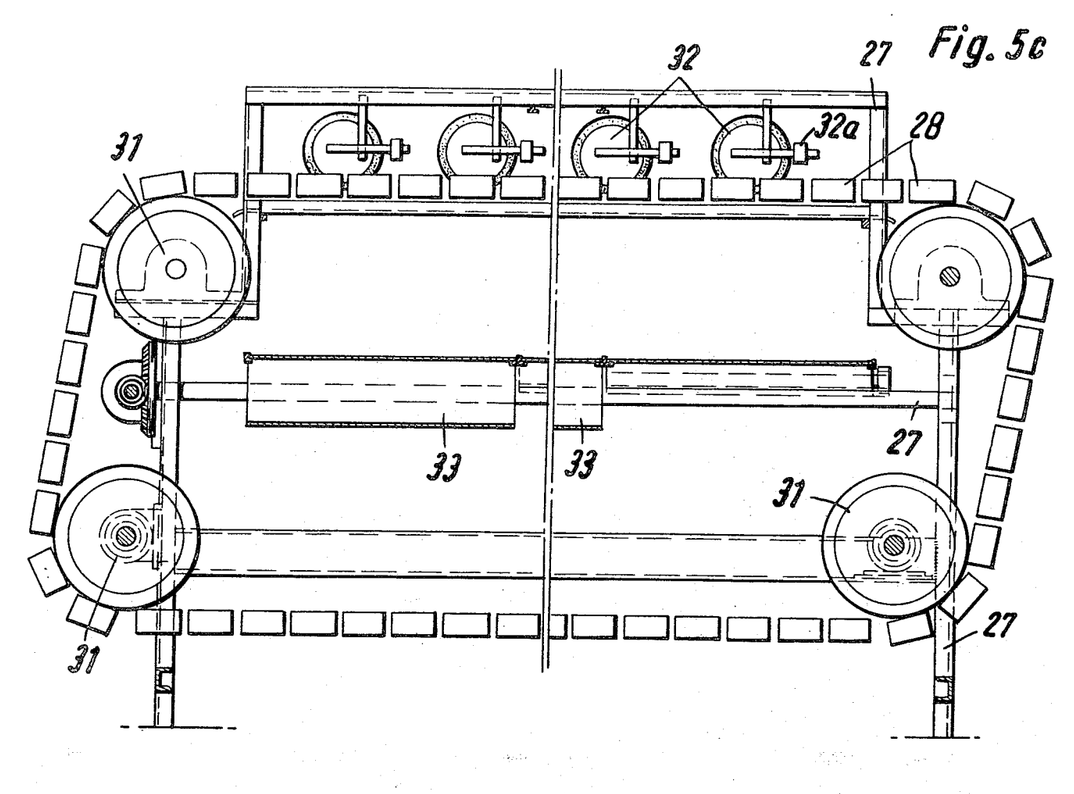
FIG. 5c is a fragmentary, enlarged vertical sectional view taken substantially on the plane of line 5c—5c of FIG. 5a and looking in the direction of the arrows. An intermediate portion of the apparatus has been removed.

It will be observed from inspection of FIG. 5b that the pivoted and counterweighted pressure wheels 32 are in a position to urge the individual asparagus stems downwardly which stems are now oriented along the line of travel of the conveyor belts 28 in a direction pointing to the left or to the east when one views the apparatus and plan as in FIG. 5a. As the individual asparagus stems are urged downwardly, they are aligned between the articulated sections of the conveyor belts 28 which are of triangular section. The conveyor belts 28 are mounted on the drive chains 46 illustrated in section in FIG. 5b.

Referring to FIG. 5b it will be observed that the pulley arrangement or variator 45 serves to reduce the speed of revolution transmitted from the motor 29 to the reducing gear 30. The grading device illustrated in FIGS. 5, 5a, 5b, 5c and 5d is distinguished by the articulated sections of the conveyor belts 28 so as to provide continuously moving channels for the asparagus stems which have their axes oriented in the direction of these channels whereby the asparagus stems descend, under the influence of gravity, to the bottom of the moving channel which, in effect, is articulated so that they may travel through an endless path.

The press wheels 32 which are disposed above the conveyor belts 28 may be idle or may be actuated mechanically. The wheels 32 may be provided with an inflated tire or they may be surrounded by foam rubber or other similar soft material so that the asparagus stems can be gently urged toward the bottom of the channel effectively set up by the moving articulated belts 28, the sections of which are of triangular configuration. Hence, it will be understood that the asparagus stems passing beneath the pressure wheels 32 are urged into the space between two neighboring triangular cross sections. The effective openings in the bottom of the channels formed by the articulated portions of the conveyors 28 are divergent. Therefore, as the asparagus stems travel from east to west, the thinner stems will fall through the effective open channel first and then progressively the thicker asparagus stems will fall through. In this manner, the asparagus stems are classified in accordance with the size, measured by diameter. As the press wheels 32 are provided with adjustable counterweights 32a, the pressure exerted on the asparagus by the press wheels may be controlled.

*Peeling apparatus*

Figure 5D:
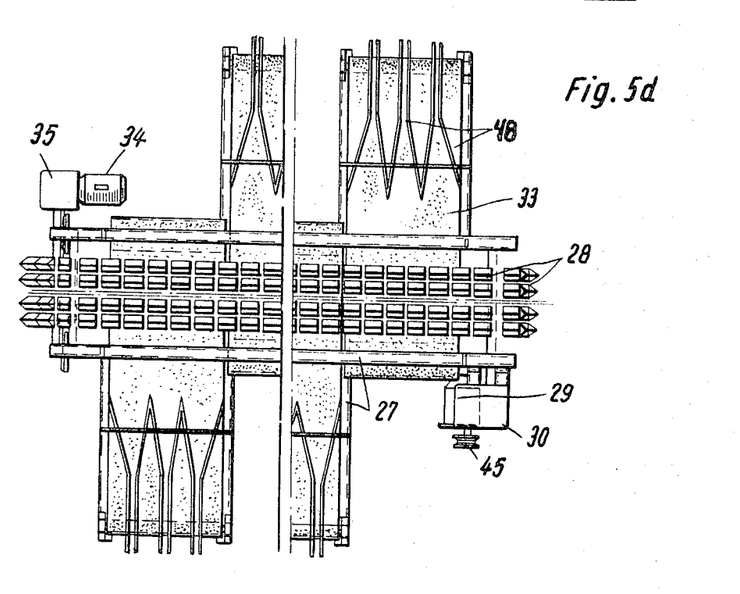

After the asparagus stems have moved to a location corresponding to their diameter, with respect to the spacing of the divergent triangular articulated sections of adjacent conveyor belts 28, they fall upon the asparagus distributing belts 33 illustrated in FIGS. 5b and 5d. The asparagus distributing belts 33 move in such a manner that the asparagus stems, which have fallen thereon, and which relate to a specific diameter group are brought from the conveyor belts 28 to the cleaning or peeling machines, see FIG. 6, disposed adjacent each exit end of the asparagus distributing belts 33.

It will be observed from inspection of FIGS. 5a and 5d that the peeling machines are oriented north and south or at right angles to the path of the conveyor belts 28 which travel from east to west so that the path of travel to the peeling machines involves an orientation like a fish bone in which the backbone of the fish corresponds to the conveyor belts 28 and the peeling machines extend at right angles to this backbone. This fish bone or comb-like arrangement of the asparagus distributing belts 33 incorporates the advantage that there remains a space between each pair of peeling machines so that an operator or operators can be positioned in such space and may monitor the conveyance of the asparagus stems to the peeling machines.

Figure 6:
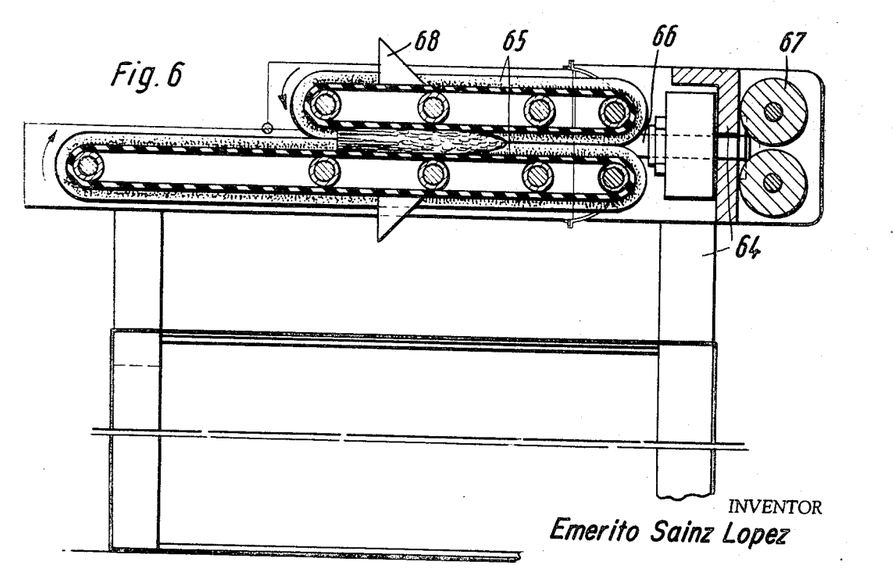
FIG. 6 is an enlarged vertical section taken substantially on the plane of line 6a—6a of FIG. 5a and looking in the direction of the arrows.

Guide devices including elements 48 illustrated in FIGS. 5b and 5d serve to guide the graded asparagus stems to the peeling machines illustrated in FIG. 6. The asparagus distributing belts 33 are located in planes which are in between the upper and lower passes of the conveyor belts 28 as illustrated in FIG. 5b.

The conveyor belts 33 are driven by an electric motor 34 associated with a reduction gear 35 and a variable speed pulley arrangement 36 shown in FIG. 5a. The rollers 49 illustrated in FIG. 5b are provided to serve in association with the asparagus distributing belts 33 and for the tensioning thereof. The cleaning or peeling machines are illustrated in longitudinal or sectional view in FIG. 6 and in the plan view of FIG. 5a in dashed lines. The peeling machine comprises a base frame 64 with endless feed belts 65. The lower belt of the two feed belts 65 projects, at the entrance end, beyond the upper belt 65 and can receive thereon, in this zone, stems of asparagus fed by the guide plates 48. The two feed belts 65 are each provided with a semicircular groove extending in the longitudinal direction of the belts so that taken together they cooperate to form a generally circular channel. Care is taken that the asparagus stems are placed in the exposed semicircular groove of the lower belt 65 which automatically feeds into the effectively circular groove formed by the cooperating belts 65 which are formed of rubber or of a material having similar properties so that the asparagus stems may be safely fed into the peeling device 66 having an appropriate aperture and so positioned as to face the effectively circular groove formed by the two feed belts 65. Thus, it will be understood, that after the asparagus stems individually leave the cooperating belts 65, they enter directly into the peeling device 66. Rollers 67 mounted in association with the exit end of the peeling device 66 receive the peeled asparagus stems and effect their discharge.

The grooves in the belt 65, in operation, effectively serve to gently press the asparagus stems into a cylindrical shape and thus they enter the absolutely cylindrical aperture of the peeling device 66 without the utilization of any other means for this purpose. The peeling device peels the asparagus stems to a diameter which is slightly smaller than the diameter of the gently pressed asparagus stems. It is this difference in diameter between the gently pressed asparagus stems and the cutting diameter of the peeling apparatus which corresponds to the removed skin of the asparagus and thus, it will be understood that the peeling is accurately controlled. The peeling apparatus is set up to accomplish this purpose for each grade or diameter of the asparagus stems. Consequently, the disadvantage of clogging because of a misfit is inhibited or eliminated and a greater peeling velocity is obtained which leads to a high degree of efficiency and increase in production.

The discharge rollers 67 are made of corrosion-resistant steel able to withstand the acids in the asparagus. The operation of the machine is enhanced as the liquid vegetable extractions, which may take place, serve to lubricate the elements of the peeling device.

The upper belt of the two endless feed belts 65 can be pivoted in such a manner, that the peeling device can be conveniently reached and can be resharpened, if necessary.

The wastes accumulating during the peeling process are entrained by the belts 65 and then removed by a cleaning element 68 attached at a desired point which may retain the waste until it may be disposed in a suitable collecting vessel.

The cleaning element 68 comprises a marginal strip for effecting the desired cleansing of the operating surface of the belts 65 as well as the groove-like channel in each belt 65. As shown in FIG. 6, a cleaning element 68 with a marginal stripping formation is provided at the topside of the upper feed belt 65, as well as the bottom side of the lower feed belt 65, so that waste material can be removed from both belts simultaneously.

It will be obvious to those skilled in the art that various changes may be made without departing from the spirit of the invention and therefore the invention is not limited to what is shown in the drawings and described in the specification but only as indicated in the appended claims.

I claim:

1. In an apparatus for the processing of asparagus for canning including the combination of means for conveying and preliminary sorting, means for washing, trimming means, heat treating means, grading means and peeling means, said means for conveying and preliminary sorting comprising a moving conveying platform upon which the asparagus stems are arranged transversely of the line of motion and with the asparagus tips all oriented in the same direction, said conveying and preliminary sorting means being unconfined at the sides along the line of movement so that preliminarily the sub-standard asparagus may be removed, a discharge aperture being located near the end of the plane of travel of the conveying and preliminary sorting means through which the sorted out rejected material may be disposed so as to not interfere with the travelling acceptable asparagus.

2. Apparatus as set forth in claim 1 wherein said washing means includes a series of compartments adapted to receive the preliminarily sorted asparagus, a water tank, means for moving said series of compartments through said water tank so as to wash the asparagus and to deposit same on the infeed side of the trimming means.

3. Apparatus as set forth in claim 2 wherein said series of compartments is made up of a circumferentially arranged set of buckets on a rotatable drum, means for holding the asparagus in the buckets as a portion of the drum is rotated through the water tank.

4. Apparatus as set forth in claim 1 wherein said trimming means includes at least three moving belts each moving in the same horizontal direction and at the same lineal speed, the first of said belts being relatively wide and adapted to receive the asparagus with the axis of each stem oriented transversely of the belt and with its tip always oriented in the same direction, the second of said belts being slightly spaced from said first belt and having its supporting face in the same place as the first belt, the third of said belts having its asparagus contacting face arranged vertically or at right angles to said first and second belts but still travelling horizontally, a trimming blade located between the first and second belts arranged to sever the lower portion of the asparagus stalk from the upper portion of the asparagus stem which includes the asparagus tip whereby the said three belts in cooperation with the trimming blade not only move the asparagus but trim the asparagus to size so that each asparagus stem is of the same length as the other asparagus stems and the asparagus stalk which has been trimmed from the lower end of the asparagus will be separated from the asparagus stem which includes the asparagus tip which continues on its path, means for gently holding the asparagus in position as the trimming blade operates on the asparagus.

5. Apparatus as set forth in claim 4 wherein means is provided for adjusting the position of said third belt so that the length of cut asparagus stems may be varied as desired.

6. Apparatus as set forth in claim 1 wherein said heat treating means comprises a continuous conveyor upon which are mounted in articulated fashion a series of top opening containers within which the asparagus are placed with the asparagus tips extending through the opening and the trimmed ends of the asparagus stems are in contact with the bottom of the containers, means surrounding at least a portion of said conveyor with the heat treating section for heat treating the asparagus, means for applying a chilling medium to said containers after they leave said heat treating section so that heat may be removed therefrom, means for controlling the thermal effect on the asparagus by controlling the heat transmission and controlling the speed of movement of the containers, means for discharging said thermally treated asparagus from the containers on said conveyor.

7. Apparatus as set forth in claim 6 wherein said continuous conveyor is of such configuration that the compartments at its infeed side are arranged in a relatively low level and the compartments on the conveyor at the exit side are at a relatively high level.

8. Apparatus as set forth in claim 7 wherein said conveyor includes a frame which acts to confine the path of travel along a locus following the outline approximating the neck of a swan.

9. Apparatus as set forth in claim 6 wherein said discharge means includes a chute oriented downwardly and outwardly whereby asparagus stems may be discharged from said compartments downwardly and outwardly and onto the conveyor of grading means.

10. Apparatus as set forth in claim 6 wherein said heat treating section includes a steam boiler and wherein said chilling means includes means for spraying chilled water.

11. Apparatus as set forth in claim 1 wherein said grading means comprises a series of pairs of parallel articulated conveyors wherein each articulated section of said conveyors is of such cross section that an adjacent pair will form an open bottom trough or channel, controlled pressure means located above the said trough or channel formed by adjacent pairs of articulated sections of adjacent conveyors, adjacent articulated sections of adjacent conveyors being so spaced from each other that the bottom of said trough or channel is open, said pairs of articulated sections of adjacent conveyors having their axes in non-parallel and divergent relationship so that the resulting opening in the bottom of said channel or trough is progressively wider and that the location selected to be measured is at a further distance from the infeed end of said conveyor, whereby infed asparagus will repose in the bottom of said trough or channel and first the thinner asparagus or asparagus of lesser diameter will fall through at a first grading station and as the conveyor proceeds successively larger asparagus will fall through the opening in the bottom of the trough or channel along a series of grading stations and at each grading station asparagus of substantially uniform thickness or diameter will be deposited.

12. Apparatus as set forth in claim 11 wherein the cross section of each articulated section of one of the grading conveyors is of triangular section.

13. Apparatus as set forth in claim 11 wherein said controlled pressure means comprises a series of wheels and wherein the axis of each wheel is transverse of a corresponding trough or channel and a plane through the center of the wheel transverse to the axis thereof will pass through the axis of the trough or channel.

14. Apparatus as set forth in claim 13 wherein said wheel is provided with a soft periphery and wherein each wheel is pivotally mounted and adjustably counter-balanced so that the pressure afforded by said pivotally mounted wheel may be adjusted.

15. Apparatus as set forth in claim 1 wherein said peeling means comprises a guide and infeeding means for guiding and infeeding susbtantially uniform unpeeled asparagus stems to a peeler, said peeler acting to cut away the exterior skin of the asparagus so as to reduce it to a precise diameter and the amount of skin being cut away is the difference between the exterior size of the asparagus before peeling and the set diameter size of the peeler.

16. Apparatus as set forth in claim 15 wherein said infeeding means comprises a pair of soft belts each of which are semicircularly grooved so as to form a trough in the center of each belt and extending along the longitudinal axis of the belt, said belts travelling in opposite directions with meeting faces so as to provide a tubular path for the feeding of the asparagus stems which tubular path is of controlled size depending upon the grade of the asparagus to be peeled, said tubular path being formed of the walls of said belts so as to gently conform the natural shape of the asparagus to a true cylindrical formation before it is presented to the peeler.

References Cited

UNITED STATES PATENTS

| | | | |
|---|---|---|---|
| 1,952,418 | 3/1934 | Chapman | 99—355 |
| 2,299,658 | 10/1942 | Smith | 99—239 |
| 2,853,937 | 9/1958 | Peck | 99—355 X |

ROBERT W. JENKINS, *Primary Examiner.*

U.S. Cl. X.R.

95—3.15; 99—239, 352.